US011528656B2

(12) United States Patent
Roy et al.

(10) Patent No.: US 11,528,656 B2
(45) Date of Patent: Dec. 13, 2022

(54) MULTIPLEXING LOGICAL CHANNELS WITH DIFFERENT CHANNEL ACCESS PRIORITY CLASS IN NEW RADIO UNLICENSED

(71) Applicant: MediaTek Singapore Pte. Ltd., Singapore (SG)

(72) Inventors: Abhishek Roy, San Jose, CA (US); Pradeep Jose, Cambridge (GB); Chia-Chun Hsu, Hsin-Chu (TW)

(73) Assignee: mediatek Singapore pte ltd., Singapore (SG)

( * ) Notice: Subject to any disclaimer, the term of this patent is extended or adjusted under 35 U.S.C. 154(b) by 103 days.

(21) Appl. No.: 16/924,387

(22) Filed: Jul. 9, 2020

(65) Prior Publication Data

US 2021/0051572 A1  Feb. 18, 2021

Related U.S. Application Data

(60) Provisional application No. 62/885,861, filed on Aug. 13, 2019.

(51) Int. Cl.
*H04W 48/16* (2009.01)
*H04W 48/10* (2009.01)
*H04W 80/08* (2009.01)
*H04W 16/14* (2009.01)
*H04W 74/08* (2009.01)

(52) U.S. Cl.
CPC .......... *H04W 48/16* (2013.01); *H04W 16/14* (2013.01); *H04W 48/10* (2013.01); *H04W 74/0833* (2013.01); *H04W 80/08* (2013.01)

(58) Field of Classification Search
CPC ..... H04W 48/16; H04W 16/14; H04W 48/10; H04W 74/0833; H04W 80/08
See application file for complete search history.

(56) References Cited

U.S. PATENT DOCUMENTS

| | | | |
|---|---|---|---|
| 2005/0286477 A1* | 12/2005 | Gupta | H04W 74/0875 370/329 |
| 2007/0275728 A1* | 11/2007 | Lohr | H04L 1/1812 455/450 |
| 2008/0186946 A1* | 8/2008 | Marinier | H04W 28/06 370/349 |
| 2020/0053778 A1* | 2/2020 | Babaei | H04W 72/042 |
| 2020/0314895 A1* | 10/2020 | Bergström | H04W 74/006 |
| 2020/0337083 A1* | 10/2020 | Loehr | H04W 72/14 |
| 2021/0007146 A1* | 1/2021 | Agiwal | H04W 76/15 |

* cited by examiner

*Primary Examiner* — Dai Phuong
(74) *Attorney, Agent, or Firm* — Imperium Patent Works; Zheng Jin

(57) ABSTRACT

A method of multiplexing logical channels (LCHs) in configured grants (CG) to enable faster transmission of high priority data in 5G New Radio-Unlicensed (NR-U) is proposed. Two options of imposing a CAPC-based restriction rule on multiplexing a low priority LCH with a high priority LCH are provided. In a first option, a threshold CAPC value is configured via RRC signaling. Data belonging to LCH having a priority lower than the CAPC threshold is not allowed to be multiplexed with data belonging to LCH having a priority higher than the CAPC threshold. In a second option, each CAPC has a flag indicating if the CPAC can have reduced priority via RRC signaling. If the flag is set for the CAPC, then data belonging to LCH assigned with the CAPC cannot be multiplexed with data belonging to lower priority LCHs.

12 Claims, 4 Drawing Sheets

MULTIPLEXING LOGICAL CHANNELS WITH DIFFERENT CHANNEL ACCESS PRIORITY CLASS IN NEW RADIO UNLICENSED

CROSS REFERENCE TO RELATED APPLICATIONS

This application claims priority under 35 U.S.C. § 119 from U.S. Provisional Application No. 62/885,861, entitled "Restriction on Multiplexing a Low Priority LCH with a high Priority LCH in Configured Grants," filed on Aug. 13, 2019, the subject matter of which is incorporated herein by reference.

TECHNICAL FIELD

The disclosed embodiments relate generally to wireless network communications, and, more particularly, to multiplexing Logical Channels (LCHs) having different Channel Access Priority Class (CAPC) in new radio unlicensed (NR-U) wireless communications systems.

BACKGROUND

Third generation partnership project (3GPP) and 5G New Radio (NR) mobile telecommunication systems provide high data rate, lower latency and improved system performances. With the rapid development of "Internet of Things" (IOT) and other new user equipment (UE), the demand for supporting machine communications increases exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. One suggested solution is to use NR over unlicensed spectrum. This solution is referred to as NR-Unlicensed (NR-U). In such a solution, an established communication protocol, such as a 5G carrier can be used entirely over unlicensed spectrum to provide communication links.

In 3GPP NR, 5G terrestrial New Radio (NR) access network (includes a plurality of base stations, e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH.

Listen-Before-Talk (LBT) is a technique used in radio communications, whereby radio transmitters first sense its radio environment (channel) before it starts any transmission. LBT can be used by a radio device to find a channel the device is allowed to operate on or to find a free radio channel to operate on. In New Radio-Unlicensed (NR-U), any downlink and uplink access have to follow the LBT channel access procedure, as unlicensed frequencies are also used by other networks such as WiFi. 3GPP has classified different LBT schemes according to four different LBT categories.

The selection of LBT categories goes hand-in-hand with determining a suitable Channel Access Priority Class (CAPC). While there have been recent proposals for LBT and CAPC for user plane (UL and DL) data transmission, LBT and CAPC for control channels also need to be discussed and resolved. 3GPP has introduced four different channel access priority classes. Naturally, selecting the proper LBT type and determining a suitable CAPC is very important for transmission and reception of control messages in NR-U. Note that LBT category needs to be selected in such a way that it provides fairness with other unlicensed networks such as WiFi. Similarly, CAPC should be determined depending on the priority of the message, so that higher priority messages are assigned with higher priority CAPC (lower CAPC values).

In NR-Unlicensed (NR-U), all the nodes (UEs and gNB) need to perform LBT before acquiring the channel for transmission. After performing the LBT, the nodes also need to determine CAPC for the priority associated with the transport block (TB). It is decided in 3GPP Rel. 14 that for transport blocks (TBs) formed by data across multiple logical channels (LCHs), the lowest priority CAPC (i.e. the highest index) will be selected to preserve fairness across WiFi nodes. Moreover, during standardization activities of NR-U, it is decided that for UL configured grants (CG), the highest CAPC index (lowest priority) of LCHs multiplexed in a TB will be selected as in LTE (for WiFi coexistence). However, such a selection suffers from the fact that even if data from multiple high priority LCHs are multiplexed with a single low priority logical channel, the TB formed by the data across all the LCHs will be assigned with the lowest priority. Thus, transmission of multiple high priority (e.g. real time) data might suffer from additional latency, due to the assignment of lower priority. Hence, during the Rel-16 discussions on NR-U, it has been agreed upon that for UL CG, further studies will be carried to check if any restriction is needed on the set of CAPCs that can be multiplexed with a higher priority CAPC to form a TB.

A solution is sought for multiplexing data belonging to a lower priority LCH with data belonging to a higher priority LCH in configured grants (CG) to enable faster transmission of high priority data.

SUMMARY

A method of multiplexing logical channels (LCHs) in configured grants (CG) to enable faster transmission of high priority data in 5G New Radio-Unlicensed (NR-U) is proposed. Two options of imposing a CAPC-based restriction rule on multiplexing a low priority LCH with a high priority LCH are provided. In a first option, a threshold CAPC value is configured via RRC signaling. Data belonging to LCH having a priority lower than the CAPC threshold is not allowed to be multiplexed with data belonging to LCH having a priority higher than the CAPC threshold. In a second option, each CAPC has a flag indicating if the CPAC can have reduced priority via RRC signaling. If the flag is set for the CAPC, then data belonging to LCH assigned with the CAPC cannot be multiplexed with data belonging to other LCHs, having a lower priority (CAPC).

In one embodiment, a UE establishes a data connection with a base station or Next generation Node B (gNB) over an unlicensed band in a new radio NR-Unlicensed network. The UE receives a configured grant from the base station for an uplink transmission over multiple logical channels (LCHs) of the data connection. Each LCH is assigned with a Channel Access Priority Class (CAPC). The UE forms a transport block (TB) by multiplexing data across the multiple LCHs for the uplink transmission. The LCH multiplexing applies a CAPC-based restriction rule. The UE performs a listen-before-talk (LBT) procedure using a set of LBT parameters associated with a channel access priority class (CAPC) value. The CAPC value is determined based on the multiplexed LCHs.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
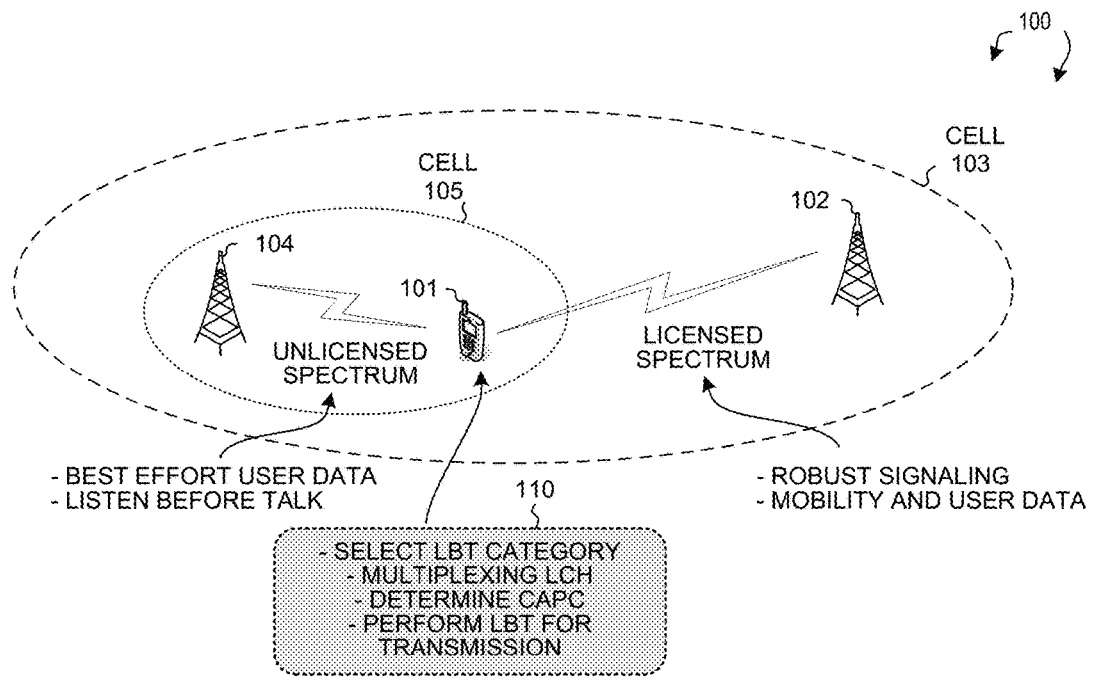
FIG. 1 illustrates an exemplary 5G new radio NR-Unlicensed (NR-U) wireless communications system that adopts Listen Before Talk (LBT) channel access mechanism for multiplexed logical channel (LCH) transmission in accordance with one novel aspect.

FIG. 1 illustrates an exemplary 5G new radio NR-Unlicensed (NR-U) wireless communications system 100 that adopts Listen Before Talk (LBT) channel access mechanism for multiplexed logical channel (LCH), in uplink transmission, in accordance with one novel aspect. NR-U wireless communications system 100 includes one or more wireless communication networks, and each of the wireless communication networks has one or more base infrastructure units, such as 102 and 104. The base infrastructure units may also be referred to as an access point, an access terminal, a base station, an eNB, a gNB, or by other terminology used in the art. Each of the wireless communication base stations 102 and 104 serves a geographic area. The geographic area served by wireless communications base stations 102 and 104 overlaps in the example of FIG. 1.

Base station 102 is a licensed base station that communicates with UE 101 via a licensed frequency band. In one example, base station 102 communicates with UE 101 via 5G NR wireless communication. Base station 102 provides wireless communication to multiple UEs within cell 103. Base station 104 is an unlicensed base station that communicates with UE 101 via an unlicensed frequency band. In one example, base station 104 communicates with UE 101 via 5G NR wireless communication. Base station 104 can communicate with multiple UEs with cell 105. In an alternative example, Licensed-Assisted Access (LAA) can be deployed, which leverages the unlicensed band in combination with licensed spectrum to deliver a performance boost for UEs. Note that, FIG. 1 is an illustrative plot. The base station 102 and base station 104 can be co-located geographically. Also note the NR-U can operate as both licensed cell and unlicensed cell, and as both primary cell as well as secondary cell.

The exponential growth in data consumption has created large bandwidth demands that cannot be met by current wireless systems. To meet this ever-increasing demand for data, new wireless systems with greater available bandwidth are needed. New Radio-Unlicensed (NR-U) wireless networks can be used to provide greater available bandwidth. An NR-U network utilizes unlicensed frequency bands in addition to licensed frequency bands contemporaneously, thereby provided additional available bandwidth to the UEs in the wireless system. For example, UE 101 can benefit from simultaneous use of the licensed frequency band and the unlicensed frequency band in an NR-U network. The NR-U network not only provides additional bandwidth for greater overall data communication, but also provide consistent data connectivity due to the presence of two separate data links. Having multiple data links available increases the probability that the UE will be able to achieve proper data communication with at least one base station at any given moment.

While utilization of the unlicensed spectrum provides more available bandwidth, the use of the unlicensed spectrum faces practical problems that need to be addressed. To facilitate efficient and fair spectrum sharing, a dynamic spectrum sharing mechanism called listen-before-talk (LBT) channel access procedure needs to be followed for all downlink and uplink transmission in NR-U, as unlicensed frequencies are also used by other networks such as WiFi. 3GPP has classified different LBT schemes according to four different LBT categories.

The selection of LBT categories goes hand-in-hand with determining a suitable Channel Access Priority Class (CAPC). While there have been recent proposals for LBT and CAPC for user plane (UL and DL) data transmission, LBT and CAPC for control channels also need to be discussed and resolved for transmissions in NR-Unlicensed systems. 3GPP has introduced four different channel access priority classes for LTE LAA (Licensed-Assisted Access), as well as NR-Unlicensed systems. Naturally, selecting the proper LBT type and determining a suitable CAPC is very important for transmission and reception of control messages in NR-U. Note that LBT category needs to be selected in such a way that it provides fairness with other unlicensed networks such as WiFi. Similarly, CAPC should be determined depending on the priority of the message, so that higher priority messages are assigned with higher priority CAPC (lower CAPC values).

In NR-Unlicensed (NR-U), all the nodes (UEs and gNB) need to perform LBT before acquiring the channel for transmission. The default LBT is Category 4 (Cat-4). After performing Cat-4 LBT, the nodes also need to determine CAPC for the priority associated with the transport block (TB). It is decided in 3GPP Rel. 14 that for transport blocks (TBs) formed by data across multiple logical channels (LCHs), the lowest priority CAPC (i.e. the highest CAPC index) will be selected to preserve fairness across WiFi nodes. Moreover, during standardization activities of NR-U, it is decided that for UL configured grants (CG), the highest CAPC index (lowest priority CAPC) of LCHs multiplexed in a TB will be selected as in LTE (for WiFi coexistence). However, such a selection suffers from the fact that even if data from multiple high priority LCHs are multiplexed with a single low priority logical channel, the TB formed by the data across all the LCHs will be assigned with the lowest priority. Thus, transmission of multiple high priority (e.g. real time) data might suffer from additional latency, due to the assignment of lower priority.

In accordance with one novel aspect, a method of multiplexing data belonging to a low priority logical channel (LCH) with data belonging to a high priority LCH in configured grants (CG) to enable faster transmission of high priority data in 5G New Radio-Unlicensed (NR-U) is proposed. Two options of imposing a CAPC-based restriction rule on multiplexing a lower priority LCH with a higher priority LCH are provided. In a first option, a threshold CAPC value is configured via high layer (e.g., RRC layer) signaling. If higher priority LCH has data available for transmission, and if data belonging to other LCHs has a CAPC priority lower than the CAPC threshold, then such data is not allowed to be multiplexed with the data of the higher priority LCH. In a second option, each CAPC has an additional flag indicating if that particular CPAC can have reduced priority or not. If data is available on an LCH assigned with a CAPC with a flag indicating that its priority cannot be lowered, then any LCH with lower priority CAPCs cannot be multiplexed with it. However, any data available in any LCH assigned with higher priority CAPCs can be multiplexed with it, given the LCHs with higher priority CAPCs do not have their flags set.

Figure 2:
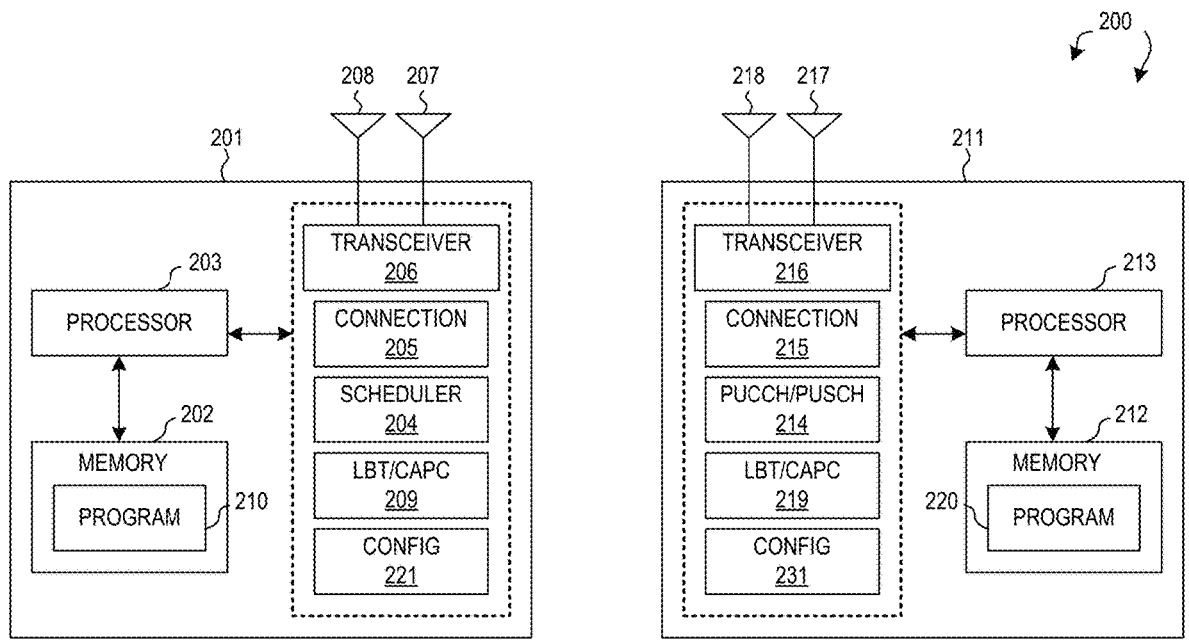
FIG. 2 is a simplified block diagram of a wireless transmitting device and a receiving device in accordance with embodiments of the present invention.

FIG. 2 is a simplified block diagram of wireless devices 201 and 211 in accordance with embodiments of the present invention. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes a connection handling module 205, a scheduler 204, an LBT/CAPC channel access circuit 209, and a configuration circuit 221. Wireless device 211 is a UE that includes a connection handling module 215, a PUCCH/PUSCH handling module 214, an LBT/CAPC channel access circuit 219, and a configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, the base station 201 establishes one or more signaling and data radio bearers with the UE 211 via connection handing circuit 205, schedules downlink and uplink transmission for UEs via scheduler 204, performs downlink LBT procedure and determines CAPC via channel access circuit 209, and provides configuration information to UEs via configuration circuit 221. The UE 211 establishes one or more signaling and data radio bearers with the base station via connection handing circuit 215, generates uplink transport block (TB) to be transmitted over PUCCH and PUSCH via PUCCH/PUSCH module 214, performs uplink LBT procedure and determines CAPC via channel access circuit 219, and obtains configuration information via configuration circuit 231. In accordance with one novel aspect, UE 211 generates the TB by multiplexing data across LCHs having different CAPC priorities based on a CAPC-based restriction rule, and then determines the CAPC value of the multiplexed LCHs for the LBT procedure. In a first option, the CAPC-based restriction rule is based on a threshold CAPC value that is configured via RRC signaling. In a second option, the CAPC-based restriction rule involves a flag per CAPC configured via RRC signaling, indicating if each CPAC can have reduced priority.

Figure 3:
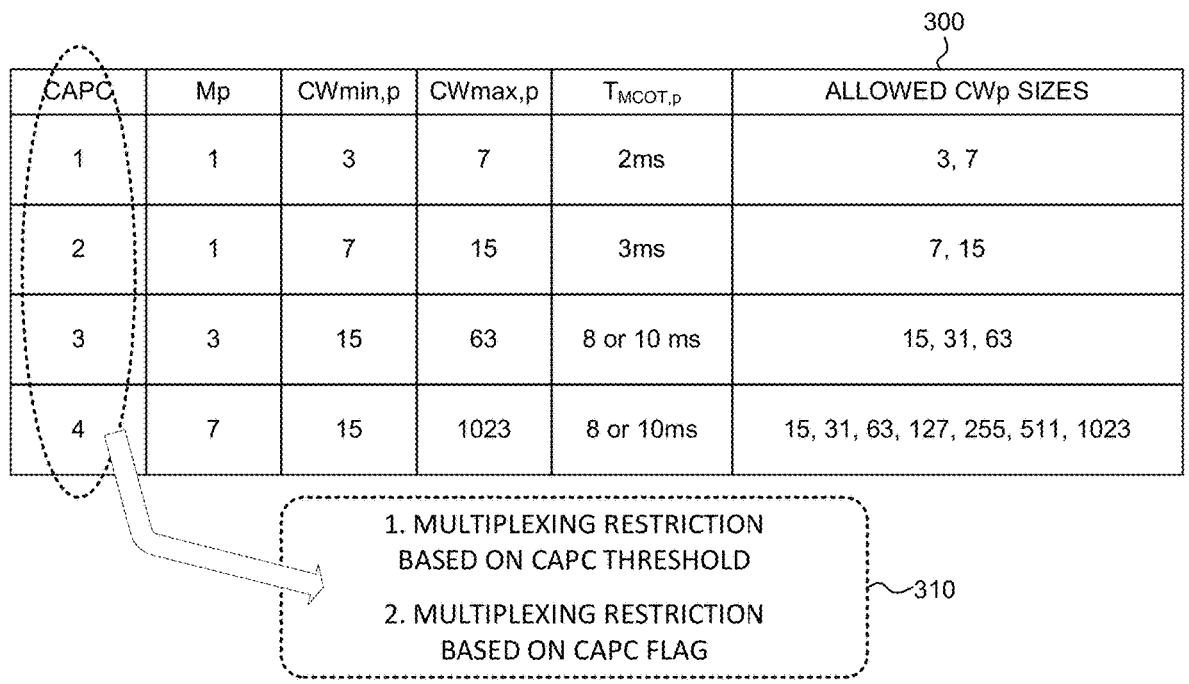
FIG. 3 shows different channel access priority classes (CAPC) for LTE LAA as well as NR Unlicensed, where CAPC threshold value or flag can be used for imposing restriction on LCH multiplexing.

FIG. 3 shows different channel access priority classes (CAPC) for LTE LAA as well as NR Unlicensed, where a CAPC threshold value or a flag can be used for imposing restriction on LCH multiplexing in accordance with one novel aspect. When performing LBT procedure, LBT category needs to be selected in such a way that it provides fairness with other unlicensed networks such as WiFi. Therefore, UE may select Category 4 LBT as the default LBT type for all transmissions as Category 4 LBT offers fairness with other unlicensed network nodes. For Category (LBT with random backoff with a contention window of variable size), the transmitting entity draws a random number N within a contention window. The size of the contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. Note that Category 4 LBT takes longer time and has lower success rate as compared to other LBT procedures.

The selection of LBT categories goes hand-in-hand with determining a suitable CAPC, because the default Category 4 LBT requires determination of CAPC. 3GPP has introduced four different channel access priority classes for LTE LAA and NR-U. FIG. 3 shows the different priority classes, where the smaller the number of the class, the higher the priority. Each priority class uses different $T_{mcot,p}$, which refers to the maximum channel occupancy time for priority class p. For the priority Classes 3 and 4, $T_{mcot,p}$ is 10 ms, if the absence of any other co-located technology sharing the same spectrum band can be guaranteed on a long-term basis. In a different case, it is limited to 8 ms. According to the 3GPP standards, a device cannot continuously transmit in the unlicensed spectrum for a period longer than $T_{mcot,p}$. In FIG. 3 Table 300, CAPC is the channel access priority class; $m_p$ is the maximum number of transmission attempts for priority class p; $CW_{min,p}$ is the minimal contention window size for priority class p; $CW_{max,p}$ is the maximum contention window size for priority class p; _and $T_{MCOT,p}$ is the maximum channel occupancy time for priority class p. For uplink transmission, TBs are formed by multiplexing available data over LCHs assigned with different CAPC values. In one novel aspect, as depicted by 310, the multiplexing of LCHs is imposed with certain restriction based on 1) a CAPC threshold value, or 2) an additional multiplexing flag per CAPC value.

Figure 4:
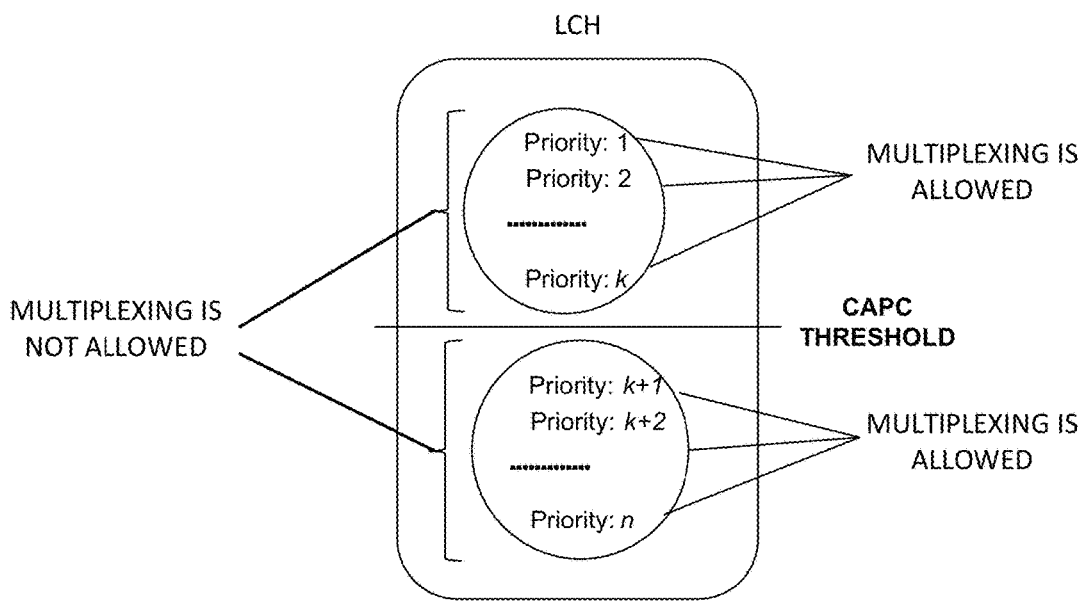
FIG. 4 illustrates one embodiment of multiplexing LCHs assigned with different CAPC values with a restriction based on a specific CAPC threshold value.

FIG. 4 illustrates one embodiment of multiplexing LCHs assigned with different CAPC values with a restriction based on a specific CAPC threshold value. When Category 4 LBT is performed for UL PDU transmission, UE needs to determine a suitable CAPC for corresponding TB transmission, where lower CAPC values reflect higher priority. In general, CAPC should be determined depending on the priority of the message, so that higher priority messages are assigned with higher priority CAPC (lower CAPC values). During standardization activities of NR-U, it is decided that for UL configured grants (CG), the highest CAPC index (lowest priority) of LCHs multiplexed in a TB will be selected as in LTE (for WiFi coexistence). To enable faster transmission of high priority data, restriction can be imposed on the multiplexing of low priority LCH with high priority LCH.

In the embodiment of FIG. 4, a threshold CAPC value is configured via RRC signaling. If an LCH, having priority higher than the threshold, has data available for transmission, and if data belonging to LCHs has a priority lower than the CAPC threshold, then such data is not allowed to be multiplexed with the data of the higher priority LCH. As depicted in FIG. 4, there are n LCHs that are associated with n different CAPC priorities. Priority 1 to k is below the CAPC threshold, while priority k+1 to n is above the CAPC threshold. UE first receives the CAPC threshold value, and then determines whether data of a higher priority LCH is allowed to be multiplexed with data of another lower priority LCH into the same transport block (TB) for transmission, based on the configured CAPC threshold value. For example, data of LCHs having priority 1 to k is allowed to be multiplexed with each other, data of LCHs having priority k+1 to priority n is allowed to be multiplexed with each other. However, data of LCHs having priority 1 to k is NOT allowed to be multiplexed with data of LCHs having priority k+1 to priority n.

As lower CAPC values represent higher priorities, mathematically, the above illustrated method can be represented as:

$$\text{data}[LCH_{CAPC=1}]*\text{data}[LCH_{CAPC=2}]*\text{data}[LCH_{CAPC=i}], \forall i \leq Th,$$

Where
* represents multiplexing

As one specific example, if CAPC 2 is set as the threshold, then a CG containing LCHs assigned with CAPC 1 and CAPC 2 can be multiplexed together for transmission. Similarly, CG containing LCHs assigned with CAPC 3 and CAPC 4 can also be multiplexed. However, CG containing LCHs having either CAPC 1 or CAPC 2 cannot be multiplexed with LCHs having either CAPC 3 or CAPC 4. Note that if data on LCH having CAPC 1 is multiplexed with data on LCH having CAPC 2 in a TB, then the TB will be assigned with the highest CAPC value, e.g., CAPC 2, with the lowest priority. In other words, UE will use CAPC 2 to perform LBT to gain channel access before transmitting the TB.

Figure 5:
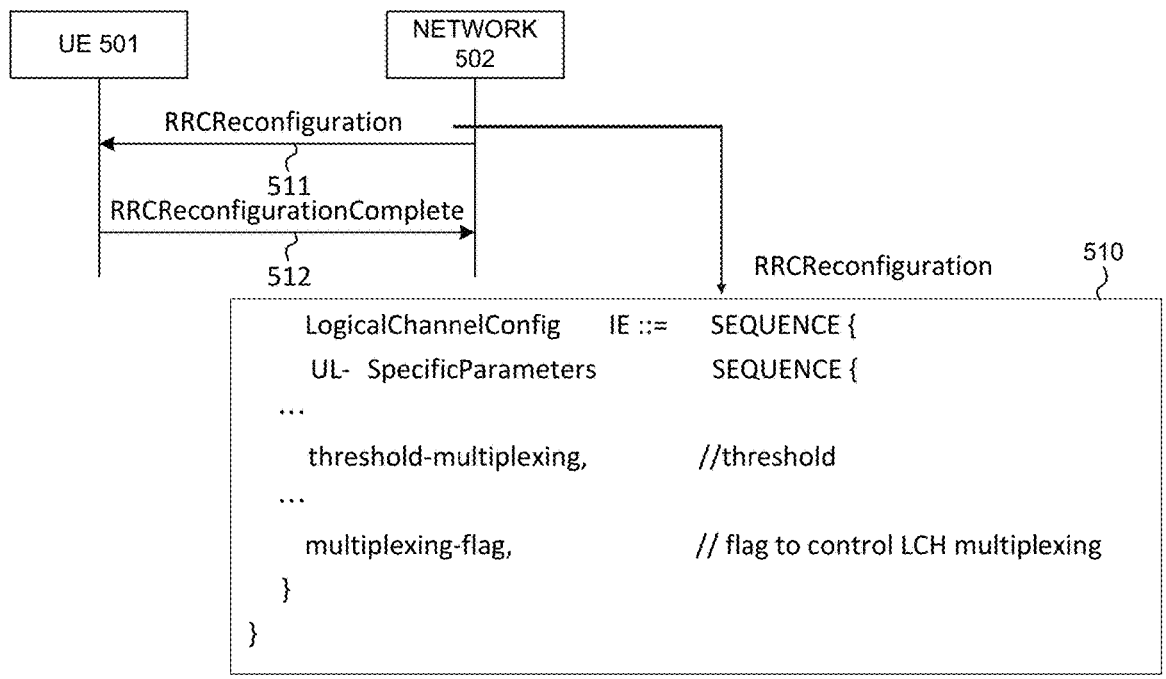
FIG. 5 illustrates another embodiment of multiplexing LCHs assigned with different CAPC values with a restriction determined based on a CAPC flag.

FIG. 5 illustrates another embodiment of multiplexing LCHs assigned with different CAPC values with a restriction determined based on a CAPC flag. In RRC configuration, network 502 can send LCH configuration information to UE 501 via RRC Reconfiguration message, e.g., via a LogicalChannelConfig Information Element (IE). As depicted in FIG. 5, the LogicalChannelConfig IE 510 comprises a sequence of uplink specific parameters, which further comprises a threshold for multiplexing, and a flag to control LCH multiplexing per CAPC. Each CAPC can have an additional flag, indicating if that particular CAPC can have reduced priority or not. If data is available on an LCH having a CAPC with a flag set to indicate that its priority cannot be lowered, then any LCH having lower priority CAPCs cannot be multiplexed with it. However, any data available in any LCH having higher priority CAPCs can be multiplexed with it, given the LCHs with higher priority CAPCs do not have their flags set. In one example, if data is available on an LCH having CAPC 2 with the flag set, then any data on an LCH having CAPC 3 or CAPC 4 cannot be multiplexed with the data on LCH having CAPC 2. However, data on an LCH having CAPC 1 can be multiplexed with the data on LCH having CAPC 2, as long as LCHs having CAPC 1 has no flag set.

Figure 6:
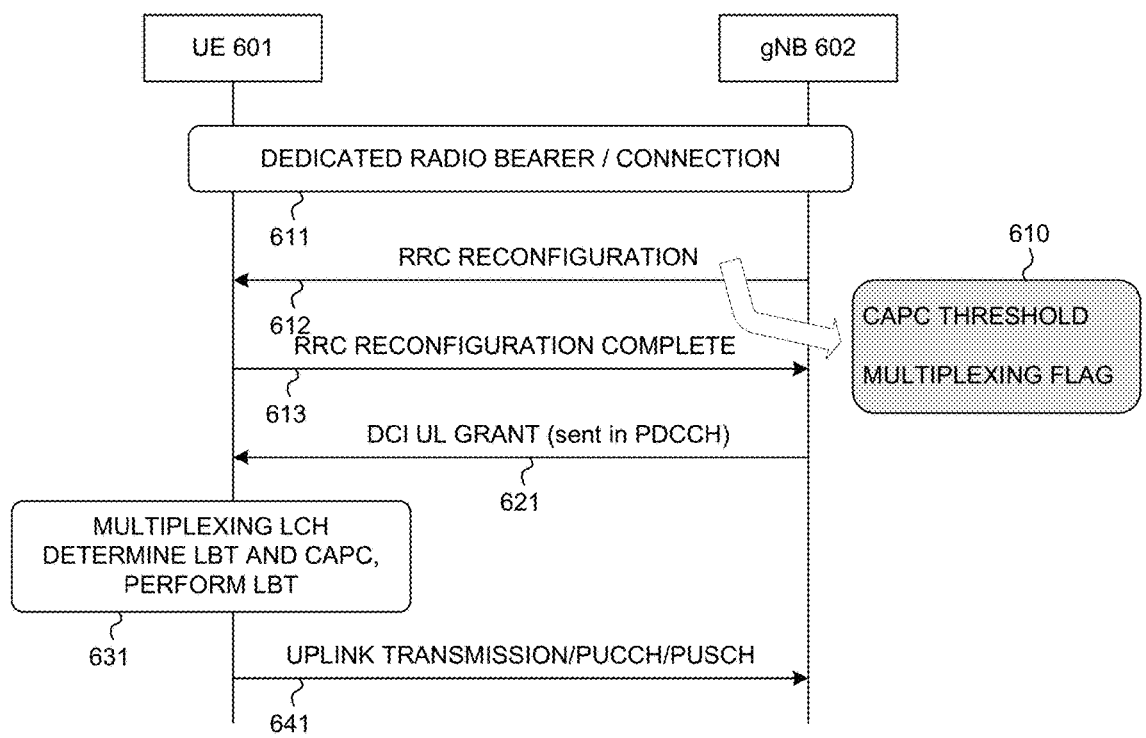
FIG. 6 illustrates a sequence flow between a UE and a base station for uplink TB transmission with multiplexed LCHs in NR-U.

FIG. 6 illustrates a sequence flow between a UE and a base station for uplink TB transmission with multiplexed LCHs in NR-U. In step 611, UE 601 and gNB 602 establish a dedicated connection with each other. For example, the dedicated connection is a signaling radio bearer (SRB) or a data radio bearer (DRB). Different SRBs are defined for different radio resource control (RRC) and non-access stratum (NAS) signaling messages. On the other hand, different logical channels are defined for what type of information is transferred, they reside between RLC sublayer and MAC sublayer, and include both control channels and traffic channels. In step 612, gNB 602 sends an RRC Reconfiguration message to UE 601. The RRC Reconfiguration message (610) may carry parameters such as the CAPC threshold value or the additional multiplexing flag for LCH configuration. In step 613, UE 601 sends an RRC reconfiguration complete message back to gNB 602. In step 621, gNB 602 provides an uplink configured grant (CG) for UL TB transmission over various LCHs. In step 631, UE 601 forms TBs by multiplexing available data on the various LCHs, determines LBT category and CAPC value, and performs UL LBT. Upon successful LBT, in step 641, UE 601 transmits the TBs to gNB 602. In one novel aspect, the multiplexing of LCHs is imposed with certain restriction based on 1) a CAPC threshold value, or 2) an additional multiplexing flag per CAPC value.

Figure 7:
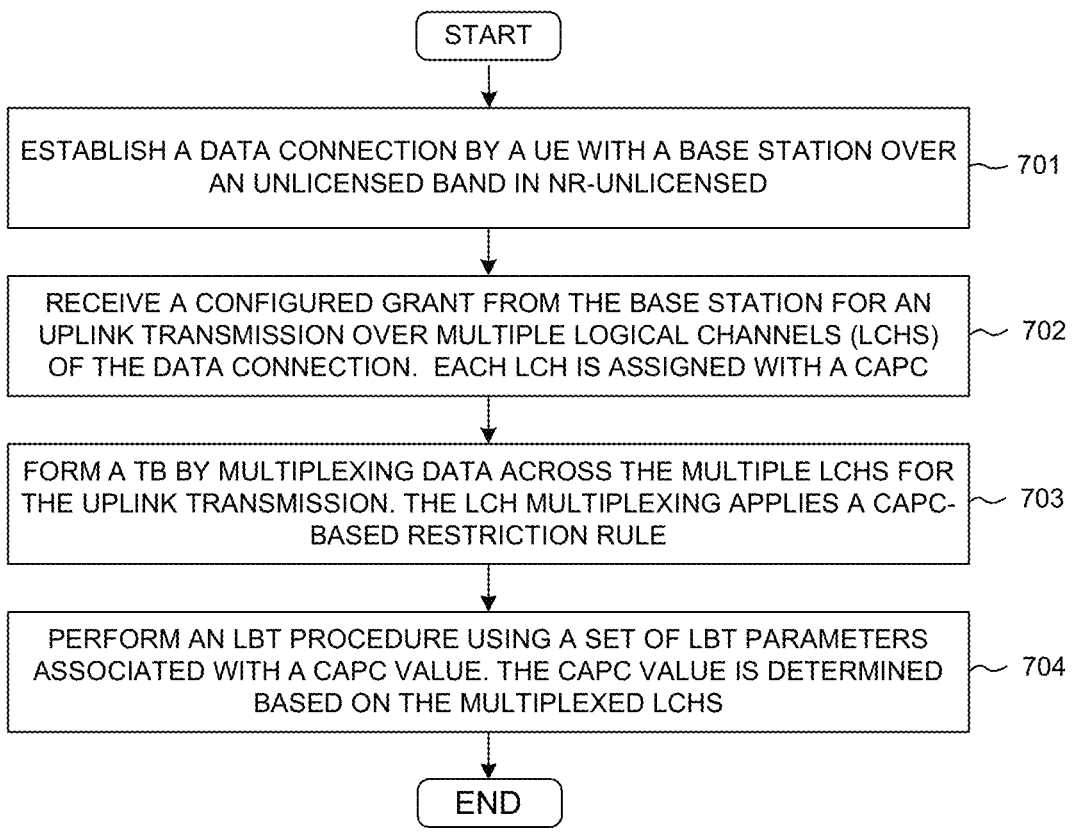
FIG. 7 is flow chart of a method of UE multiplexing data on logical channels (LCHs) with different priorities for uplink transport block (TB) transmission in 5G NR-U in accordance with one novel aspect.

FIG. 7 is flow chart of a method of UE multiplexing data on logical channels (LCHs) with different priorities for uplink transport block (TB) transmission in 5G NR-U in accordance with one novel aspect. In step 701, a UE establishes a data connection with a base station over an unlicensed band in a new radio NR-Unlicensed network. In step 702, the UE receives a configured grant from the base station for an uplink transmission over multiple logical channels (LCHs) of the data connection. Each LCH is assigned with a Channel Access Priority Class (CAPC). In step 703, the UE forms a transport block (TB) by multiplexing data across the multiple LCHs for the uplink transmission. The LCH multiplexing applies a CAPC-based restriction rule. In step 704, the UE performs a listen-before-talk (LBT) procedure using a set of LBT parameters associated with a channel access priority class (CAPC) value. The CAPC value is determined based on the multiplexed LCHs.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    establishing a data connection by a user equipment (UE) with a base station over an unlicensed band in a new radio NR-Unlicensed network;
    receiving a configured grant from the base station for an uplink transmission over multiple logical channels (LCHs) of the data connection, wherein each LCH is assigned with a Channel Access Priority Class (CAPC);
    forming a transport block (TB) by multiplexing data across the multiple LCHs for the uplink transmission, wherein the LCH multiplexing applies a CAPC-based restriction rule based on a CAPA threshold or based on a flag of an LCH, wherein data belonging to the LCH having a CAPC priority lower than the CAPC threshold is not allowed to multiplex with data belonging to LCHs having a CAPC priority higher than the CAPC threshold, or wherein data of the LCH is not allowed to multiplex with other LCHs having lower priority CAPCs when the LCH has the flag set, and wherein data of the LCH is allowed to be multiplexed with other LCHs having higher priority CAPCs as long as the higher priority CAPCs with no flags set; and
    performing a listen-before-talk (LBT) procedure using a set of LBT parameters associated with a channel access priority class (CAPC) value, wherein the CAPC value is determined based on the multiplexed LCHs.

2. The method of claim 1, wherein the CAPC threshold is configured by an LCH Configuration Information Element (IE).

3. The method of claim 2, wherein the CAPC threshold is dynamically updated by the LCH Configuration IE via a high layer signaling from the base station.

4. The method of claim 1, wherein an additional flag is dynamically updated by an LCH Configuration information element (IE) via a high layer signaling.

5. The method of claim 1, wherein the multiplexed LCH comprises a first LCH having a high priority CAPC and a second LCH having a low priority CAPC.

6. The method of claim 5, wherein the UE determines the CAPC value of the multiplexed LCHs in accordance to the low priority CAPC for performing the LBT procedure.

7. A User Equipment (UE), comprising:
    a connection handling circuit that establishes a data connection with a base station over an unlicensed band in a new radio NR-Unlicensed network;
    a receiver that receives a configured grant from the base station for an uplink transmission over multiple logical channels (LCHs) of the data connection, wherein each LCH is assigned with a Channel Access Priority Class (CAPC);
    an uplink handling circuit that forms a transport block (TB) by multiplexing data across the multiple LCHs for the uplink transmission, wherein the LCH multiplexing applies a CAPC-based restriction rule based on a CAPA threshold or based on a flag of an LCH, wherein data belonging to an LCH having a CAPC priority lower than the CAPC threshold is not allowed to multiplex with data belonging to LCHs having a CAPC priority higher than the CAPC threshold, or wherein data of the LCH is not allowed to multiplex with other LCHs having lower priority CAPCs when the LCH has the flag set, and wherein data of the LCH is allowed to be multiplexed with other LCHs having higher priority CAPCs as long as the higher priority CAPCs with no flags set; and
    a listen-before-talk (LBT) handling circuit that performs an LBT procedure using a set of LBT parameters associated with a channel access priority class (CAPC) value, wherein the CAPC value is determined based on the multiplexed LCHs.

8. The UE of claim 7, wherein the CAPC threshold is configured by an LCH Configuration Information Element (IE).

9. The UE of claim 8, wherein the CAPC threshold is dynamically updated by the LCH Configuration IE via a high layer signaling from the base station.

10. The UE of claim 7, wherein an additional flag is dynamically updated by an LCH Configuration information element (IE) via a high layer signaling.

11. The UE of claim 7, wherein the multiplexed LCH comprises a first LCH having a high priority CAPC and a second LCH having a low priority CAPC.

12. The UE of claim 11, wherein the UE determines the CAPC value of the multiplexed LCHs in accordance to the low priority CAPC for performing the LBT procedure.

\* \* \* \* \*